United States Patent
Elkurd et al.

(10) Patent No.: US 6,435,237 B1
(45) Date of Patent: *Aug. 20, 2002

(54) PNEUMATIC TIRE HAVING GENERALLY ROUNDED FOOTPRINT SHAPE

(75) Inventors: Basil Sameer Elkurd; Paul Bryson Allen, both of Akron; Timothy Patrick Lovell, Peninsula, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 71 days.

This patent is subject to a terminal disclaimer.

(21) Appl. No.: 09/594,237

(22) Filed: Jun. 14, 2000

(51) Int. Cl.[7] .................. B60C 11/11; B60C 11/12; B60C 11/13; B60C 107/00
(52) U.S. Cl. ................ 152/209.3; 152/209.18; 152/209.22; 152/209.25; 152/902; 152/DIG. 3
(58) Field of Search .............. 152/209.2, 209.3, 152/209.18, 209.22, 209.25, DIG. 3, 902

(56) References Cited

U.S. PATENT DOCUMENTS

| | | | |
|---|---|---|---|
| 3,584,670 A | * 6/1971 | Verdier | 152/209 |
| 4,474,223 A | 10/1984 | Landers | 152/209 R |
| D278,617 S | 4/1985 | Kojima et al. | D12/147 |
| D287,236 S | 12/1986 | Yonekura et al. | D12/140 |
| D287,349 S | 12/1986 | Yonekura et al. | D12/140 |
| D287,708 S | 1/1987 | Hayakawa | D12/147 |
| 4,676,290 A | * 6/1987 | Tansei et al. | 152/209.22 |
| D293,664 S | 1/1988 | Hayakawa et al. | D12/146 |
| D296,315 S | 6/1988 | Hayakawa et al. | D12/142 |
| 4,913,208 A | * 4/1990 | Anderson | 152/209.18 |
| D313,212 S | 12/1990 | Hamada et al. | D12/147 |
| 4,986,324 A | 1/1991 | Suzuki et al. | 152/209 R |
| D316,239 S | 4/1991 | Tsuda et al. | D12/145 |
| 5,125,444 A | 6/1992 | Yoshida | 152/209 R |
| 5,137,068 A | 8/1992 | Loidl et al. | 152/209 R |
| 5,293,918 A | 3/1994 | Tsuda et al. | 152/209 R |
| D350,320 S | 9/1994 | Suzuki | D12/147 |
| 5,360,043 A | 11/1994 | Croyle et al. | 152/209 A |
| 5,361,816 A | 11/1994 | Hitzky | 152/209 R |
| 5,388,625 A | 2/1995 | White | 152/209 R |
| D369,768 S | 5/1996 | Wakamatsu | D12/147 |
| 5,580,404 A | 12/1996 | Hitzky | 152/209 R |
| D380,183 S | 6/1997 | Matsuda et al. | D12/147 |
| D384,312 S | 9/1997 | Powell et al. | D12/147 |
| D386,730 S | 11/1997 | Hubbell, Jr. | D12/147 |
| D390,519 S | 2/1998 | White | D12/147 |
| 5,733,393 A | * 3/1998 | Hubbell et al. | 152/DIG. 3 |
| 5,753,057 A | * 5/1998 | Wesolowski | 152/209.2 |
| D397,648 S | 9/1998 | Allen et al. | D12/147 |
| D402,240 S | 12/1998 | Hubbell, Jr. | D12/146 |
| 5,871,598 A | 2/1999 | Tomita | 152/209 R |
| D414,447 S | 9/1999 | Weber et al. | D12/143 |
| 5,974,872 A | * 11/1999 | Morishita et al. | 152/209.2 |
| 6,109,318 A | * 8/2000 | Yukawa | 152/209.2 |

FOREIGN PATENT DOCUMENTS

| | | | |
|---|---|---|---|
| EP | 800935 | * | 10/1997 |
| JP | 62-4608 | * | 1/1987 |
| JP | 3-189211 | * | 8/1991 |
| JP | 4-201610 | * | 7/1992 |
| JP | 4-297305 | * | 10/1992 |

* cited by examiner

Primary Examiner—Steven D. Maki
(74) Attorney, Agent, or Firm—David E. Wheeler

(57) ABSTRACT

A pneumatic tire having improved snow traction and tread wear, and improved noise and handling properties, has 80 to 105 pitches and a sipe density of 1.0 to 1.1. The tire has a substantially rounded footprint, and has a footprint shape factor (FSF) of 1.2 to 1.5. The tire has an open central and intermediate region, as compared to the shoulder region, and has lateral groove depths that vary from 50% to 100% of the tread depth, wherein the shallower grooves are disposed toward the central and intermediate regions of the tire.

6 Claims, 4 Drawing Sheets

PNEUMATIC TIRE HAVING GENERALLY ROUNDED FOOTPRINT SHAPE

BACKGROUND OF THE INVENTION

The invention relates to pneumatic tires which have improved snow traction and tread wear, and improved noise and wet and dry handling characteristics.

It is a continuing goal in the art to improve the properties of pneumatic tires. This continuous improvement is driven by competition between the tire manufacturers and also, to some extent, by a drive for improvement by vehicle manufacturers. To some extent, improvements in original equipment (OE) tires are driven by competition between the automobile manufacturers.

Sometimes, improvements manifest themselves in entirely new and revolutionary tire constructions, and sometimes the improvements comprise incremental changes that are required of a tire manufacturer by a vehicle manufacturer to meet OE specifications. Relatively small changes in tread design, and changes in and use of materials, can cause significant differences in tire properties, and such differences may mean the difference between meeting specifications and being rejected by the OE customer.

Tires similar to the tire of the invention have been used in OE accounts in previous years with satisfactory performance. As changes in vehicle design, and especially the design of the suspension of a vehicle takes place, changes in the tires are required, always with the goal of improving the performance of the tire/vehicle combination.

It is an object of the present invention to improve the performance of a tire line that is currently in commercial use.

Other objects of the invention will be apparent from the following description and claims.

Definitions

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Contact Patch" refers to a section of footprint, in a footprint that is divided into sections by wide void areas, that maintains contact with the ground.

"Crown" refers to the circumferentially outermost portion of the carcass substantially within the width limits of the tread.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be sub-classified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Lugs" refer to discontinuous radial rows of tread rubber-in direct contact with the road surface.

"Net-to-gross" refers to the ratio of the ground-contacting surface of a tread to the total tread area.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Shoulder" refers to the upper portion of sidewall just below the tread edge.

"Sidewall" means that component which comprises a portion of the outside surface of a tire between the tread and the bead.

"Sipes" refer to small slots molded into ribs of a tire that subdivide the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

SUMMARY OF THE INVENTION

A pneumatic tire comprises at least a pair of annular beads, at least one carcass ply wrapped around the beads, tread disposed over the carcass ply in a crown area of the tire, and sidewalls disposed between the tread and the beads, the tread pattern having lugs formed by the intersection of lateral grooves and circumferential grooves, the improvement comprising a tread pattern having 80 to 105 pitches and a sipe density in the lugs of 1.0 to 1.1 sipes per pitch.

In the illustrated embodiment, the tire has 4 circumferential grooves, and 98 pitches in a PJ-5 pitch sequence. The tire has a combined net-to-gross ratio in the center and intermediate lug portions of 0.58 to 0.62, and a net-to-gross ratio in the shoulder portions of 0.75 to 0.8 and an overall net-to-gross ratio of 0.646.

The illustrated tire has a rounded footprint shape and a footprint factor of 1.2 to 1.5, preferably 1.2 to 1.4.

The sipes in the shoulder region of the tire are at substantially 90° with respect to the equatorial plane of the tire. Also, the lateral grooves are at substantially fill tread depth in the shoulder region of the tire and are graded to less than full tread depth at the center of the tire. Specifically, the lateral grooves are at substantially full tread depth in the shoulder region of the tire with tie bars ½ tread depth, and are graded to about ⅔ tread depth at the center of the tire.

DETAILED DESCRIPTION OF THE INVENTION

Figure 1:
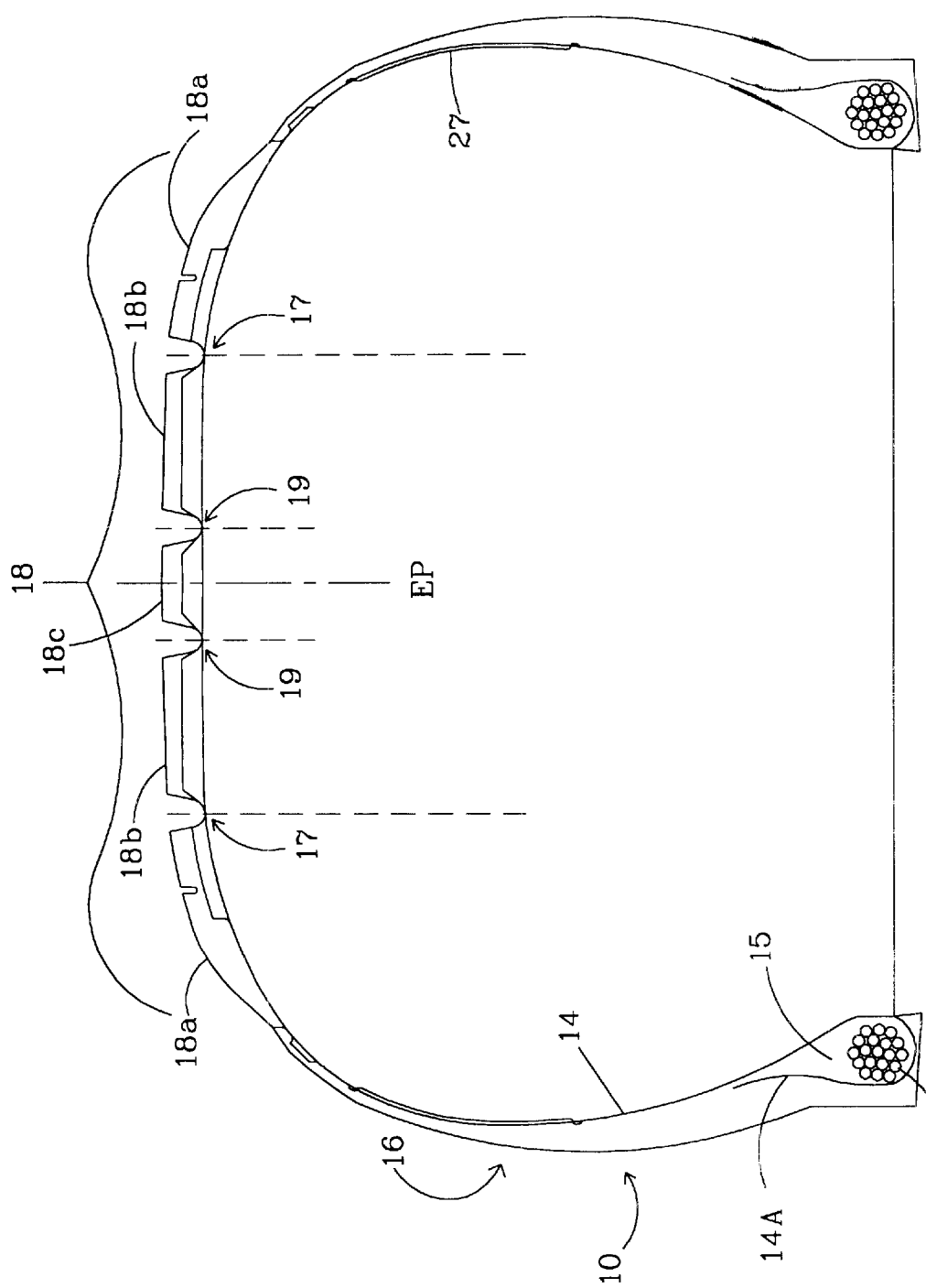
FIG. 1 is a cross-sectional view of one embodiment of a tire of the invention.

With reference now to FIG. 1, an illustrated tire (10) has a tread portion (18) which has two shoulder circumferential grooves (17) and two center circumferential grooves (19). Circumferential grooves (17, 19) divide the tread into five portions, two shoulder portions (18A), two intermediate portions (18B), and center portion (18C). For ease of description, the lugs in each of the portions will be defined as being delineated by the center of the circumferential grooves, so that the term "tread portions" (18A, 18B, 18C), and lugs (18A, 18B, 18C) can be used interchangeably in this specification.

The tire (10) has a pair of substantially parallel annular beads (12) around which is wrapped carcass ply (14). The end portions of carcass ply (14) that wrap around beads (12) are called the "ply turn-ups" (14A). Apex (15) is sandwiched between the main body of carcass ply (14) and its turn-up (14A). Sidewalls (16) are disposed over carcass ply (14) in the area of the tire between beads (12) and tread (18).

Figure 2:
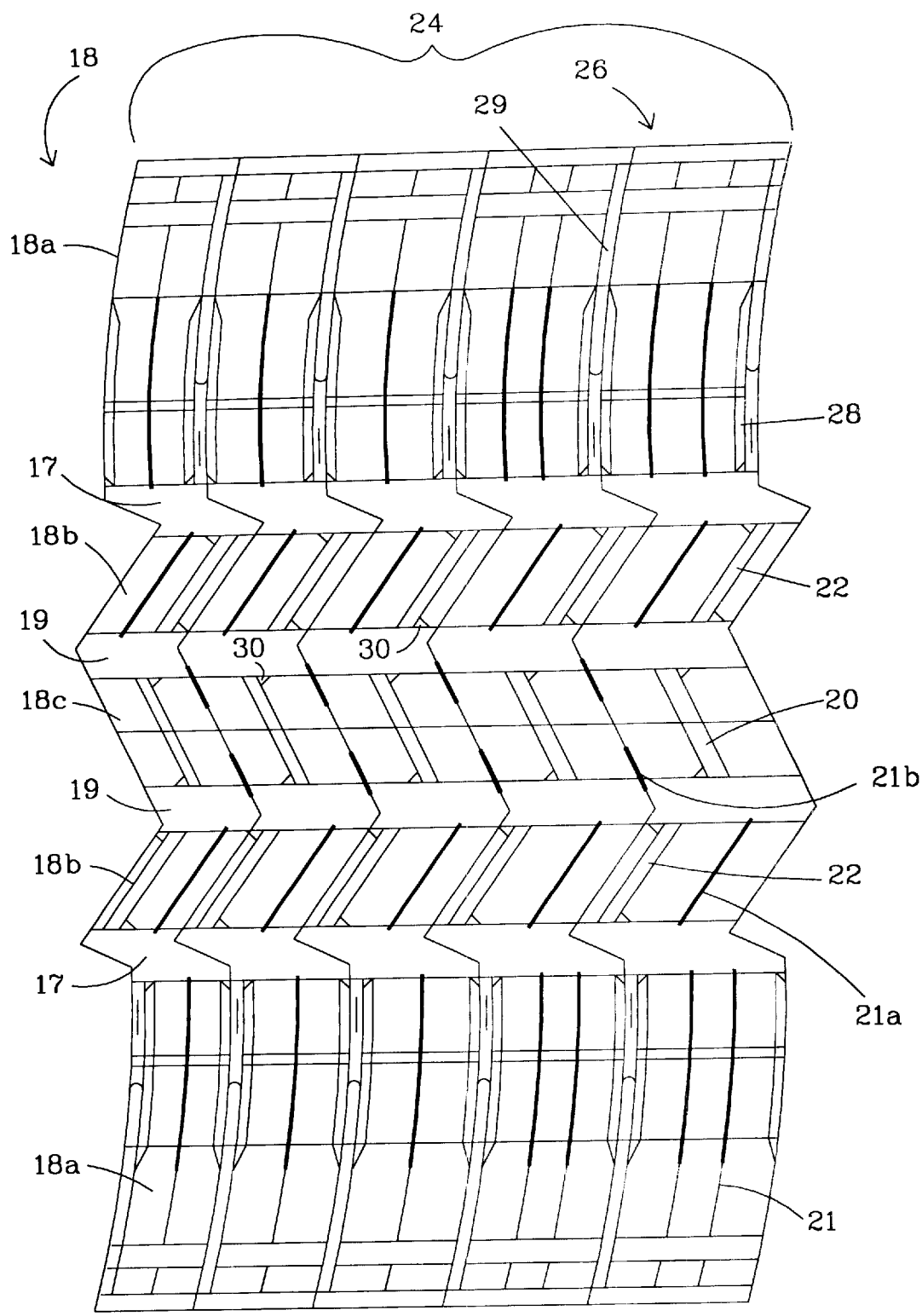
FIG. 2 is a view of a section of the tread of the tire of the invention.

With reference now to FIG. 2, an illustrated tread (18) of the invention has a non-directional pattern. By "non-directional" it is meant that the tire can be mounted on either side of the vehicle and the same tread pattern will be observed.

To improve the snow traction specifications of a tire, the inventors conceived the idea to increase the number of pitches in the tire. Although conventional tires generally have about 56 to 72 pitches, the inventors theorized that if more pitches were provided, e.g., 80 to 105 pitches, the smaller lugs required to place this number of pitches in the circumference of a tire would increase the number of biting surfaces in the tread at the lug edges. Also, it is believed that the smaller lugs reduce the severity of the impact of the lug edges on the pavement as the tire rotates, which is believed to help reduce noise.

The addition of sipes (21, 21a, 21b) in the tread also provides additional biting surfaces to the tread, as well as increasing the tread flexibility. In the illustrated tire of the invention, the sipes are placed at a substantially 90° angle with respect to the equatorial plane (EP) of the tire. The sipes generally pass through the full length of the pitch, and substantially equally divide the pitch into two or more segments. In the larger pitches, two or more such sipes are provided.

In general, the density of sipes in the tire of the invention is 1.0 to 1.3 sipes per pitch, and in the tread pattern illustrated in FIG. 2, there are 110 sipes in 98 pitches, or 1.12 sipes per pitch.

In addition, the added flexibility of the tread, caused by the sipes and the large number of pitches, makes it easier for the tread to wrap around anomalies in the pavement, and to make smoother tread transitions in and out of the contact patch of the tire as the tire rotates, which is believed to reduce the squirm of the tread in the footprint, which improves ride, handling, irregular wear, and overall tread-wear of the tire.

In the illustrated tire of FIG. 2, 98 pitches were used in a 5-pitch sequence. By "5-pitch sequence", it is meant that five different sizes of lugs were used, each size of lug representing one pitch.

In addition to the increased number of pitches, the tire of the present invention was changed from the prior art production tire by providing a more open center and intermediate area, i.e. portions (18B, 18C) in the tire. By more open, it is meant that the void area of the intermediate and central portions (18B, 18C) are increased as compared to the void area of the comparable portion of the prior art tire, and as compared to the shoulder portion of the tire of the invention. The void area of a tire can be represented by its net-to-gross ratio. The combined net-to-gross ratio in portions (18B, 18C) of the illustrated tire of the invention is 0.605, whereas the net-to-gross ratio in the total tread area is 0.646. The net to gross in the shoulder region of the tire is 0.75 to 0.8. It is believed that beneficial properties of the invention will be observed when the net-to-gross in the center portion and intermediate portion of the tire together (18B+18C) is 0.58 to 0.62, preferably 0.60 to 0.61, and the global, or overall net-to-gross ratio of the tire is 0.64 to 0.66.

The lower net-to-gross in central portion (18B, 18C) of the tire is achieved by providing wider lateral grooves (20, 22) as well as wider circumferential grooves (17, 19) than were used in the prior art tire. The circumferential grooves (17, 19) together comprise a void area of 18% to 24% of the tread width. In the illustrated embodiment, circumferential grooves (17, 19) together represent 21% of the tread width of the tire.

As compared to the prior art tire, lateral grooves (29) in the shoulder portion (18A) of the tire are narrower, providing a more solid shoulder region (18A) in the tire. It is believed that the more solid shoulder area improves the handling and grip of the tire.

Figure 3:
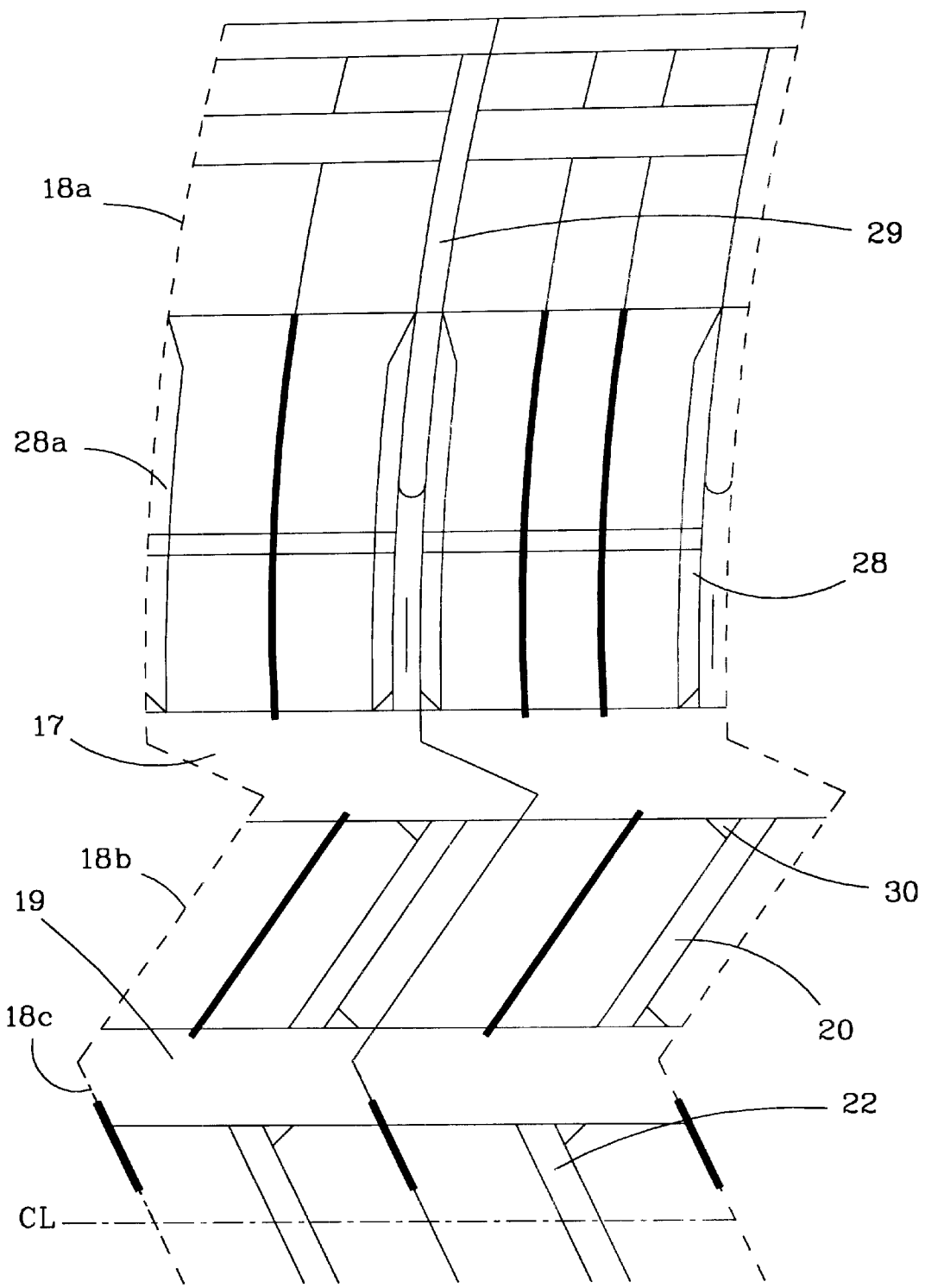
FIG. 3 illustrates a detailed view of a portion of FIG. 2.

With reference now to FIG. 3, lateral groove (29), on the axially inner portion of lug (18A), has chamfers (28) on the leading edge of the lateral groove, and opposed chamfers (28A) on the trailing edge of the lateral groove. These chamfers are believed to improve the noise properties of the tire. In addition, chamfers (30, 30A) are provided on the leading and trailing edges of the lugs where the angles of the lugs create sharp corners. Chamfers (30, 30A) are believed to improve the irregular wear properties of the tire. The chamfers are also believed to help prevent loss of the corners in the mold when the tire is removed from the mold after curing.

Figure 4:
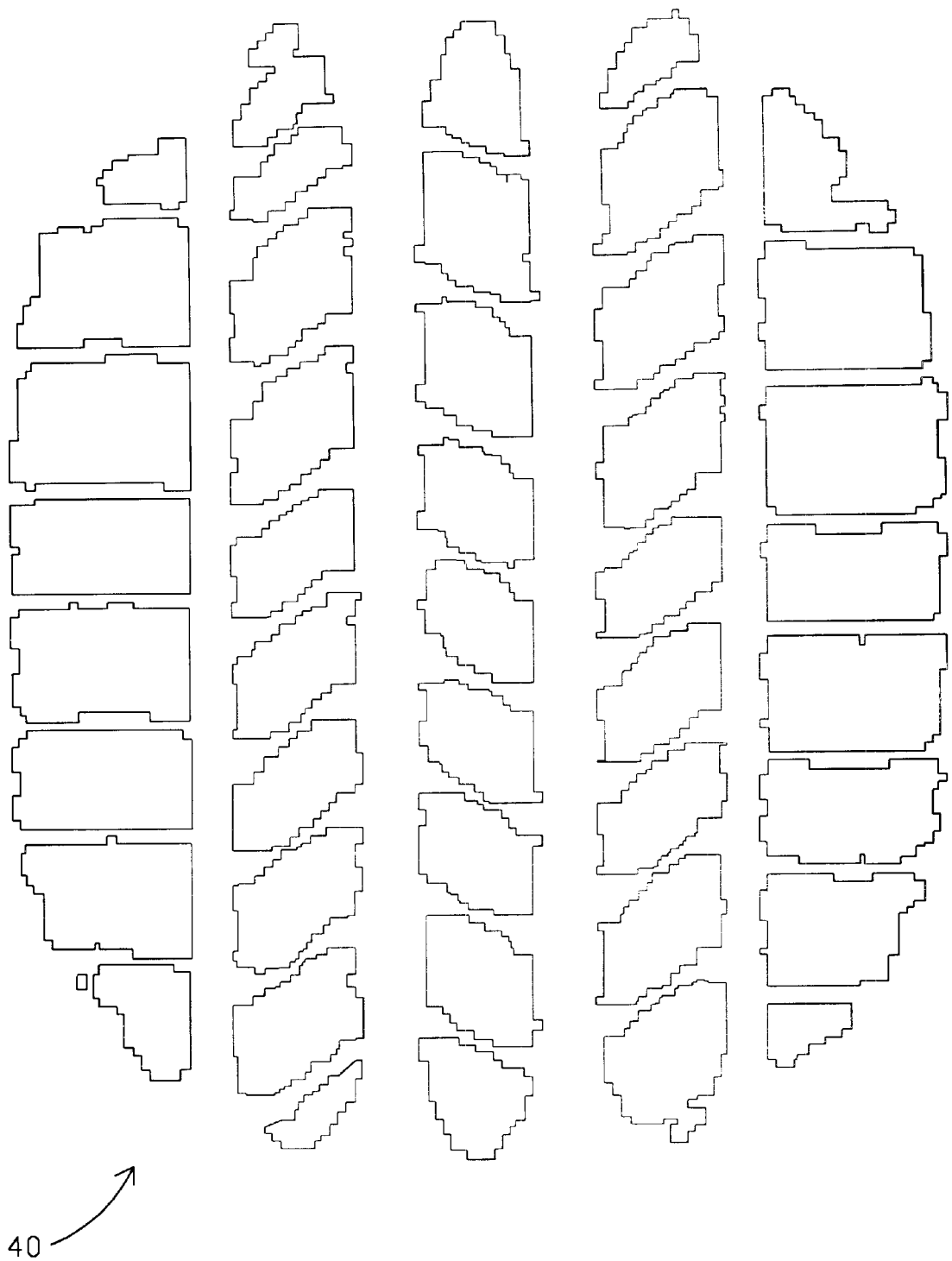
FIG. 4 illustrates a footprint shape of a tire of the invention.

With reference now to FIG. 4, the footprint (40) of the tire (10), when inflated to 35 psi with a 1300 lb. load, has a generally rounded shape with a footprint shape factor of 1.3 to 1.4. The round shape of the footprint is believed to contribute to the excellent snow handling and better wet handling, as well as the other improved properties observed in the example below.

The illustrated tire of FIGS. 1 and 2 has a footprint factor of about 1.35. The footprint factor is defined by the ratio of the length of the footprint at its centerline (CL) and the length of the footprint at the shoulder, as defined by Hubbell, et al. in U.S. Pat. No. 5,733,393, said patent being incorporated herein by reference.

As is illustrated in the Hubbell, et al patent, and by "Mechanics of Pneumatic Tires", a publication of the U.S. Department of Transportation, as well as other publications, the footprint of a tire is influenced by the carcass construction of the tire, the materials and the end count and cord angles of the crown reinforcement, the hardness of the tread rubber, the flexibility of the sidewalls, the length of the carcass turn-up, the length of the carcass cords, the width of the crown reinforcement, the mold shape of the tire, as well as the number of carcass plies and the angle of the carcass ply reinforcement, the load, and the size of the tire. Those skilled in the art will be able to achieve the footprint factor of the invention by adjusting these parameters for particular tire constructions.

The tire of the invention may be made to utilize a β pitch sequence, an RPAH sequence or any other pitching that is found to be acceptable for a given road surface or purpose. In the illustrated embodiment, a PJW-5 pitch sequence, as defined by Wesolowski in U.S. Pat. Nos. 5,743,974, 5,753,057, 5,759,310 and 5,759,312, is used.

Pitching, as it relates to tires, is well characterized by the prior art, as illustrated by U.S. Pat. No. 4,474,223 to Landers, and references cited therein, and references in which the patent is cited.

With reference again to FIG. 1, the carcass of the tire may comprise a turn-up ply (14A) and a high apex (15) to improve the stiffness of the tire sidewall.

In the illustrated tire of the invention, the carcass has one polyester carcass ply (14) wrapped around beads (12), and an apex (15) that extends substantially to the midsection height of the tire. Apex (15) is sandwiched between the body of carcass ply (14) and its turn-up (14A). An optional innerliner (27) is disposed over the at least one carcass ply (14) in the cavity of the tire.

In the illustrated embodiment, carcass reinforcement comprises polyester cords and belt reinforcement comprises 1500/2 steel cords.

Those skilled in the art will recognize that other circumferential reinforcement, including conventional steel belts with overlays, as well as other suitable constructions, may be used in the tire construction of the invention.

The tread rubber is prepared as is conventional in the art using conventional initiators and accelerators. Rubber compositions of the type that can be used in the tread are illustrated in U.S. Pat. No. 5,319,026, said patent being incorporated herein by reference.

The footprint is narrower than it is long, and the footprint length may be 105% to 120% of the footprint width. In the illustrated embodiment, the footprint length is about 115% of the footprint width.

The invention is further illustrated with reference to the following example:

EXAMPLE

A size 215/70R15 tire, having the tread parameters and design described herein, was constructed as described in the specification, and as illustrated by the drawings, with 98 pitches. The tire, designated C3, was compared with the best competitor tire available, which was designed for a similar purpose, as a control. Results of testing are illustrated in Table 1.

TABLE 1

|  | Control | C3 |
|---|---|---|
| FWG Mileage: LF | 52,800 | 75,600 |
| FWG Mileage: RF | 54,200 | 73,800 |
| FWG Mileage: LR | 86,000 | 76,800 |
| FWG Mileage: RR | 150,000 | 80,000 |
| Snow Handling | Control | +++ |
| Snow Traction | 100 | 121 |
| Wet Handling | Control | — |
| RRC | ~9.3 | ~9.1 |
| Noise | Control | + |
| Noise After Wear | Control | — |
| Footprint Shape Factor | 1.089–1.038 | 1.45–1.33 |

Mileage of the tire is determined by adding the mileage of the tires at each position on a vehicle and dividing by 4. The data indicates that the tire of the invention has a wear rating slightly lower than the control tire. The tire of the invention is much better with respect to snow handling, and snow traction, and slightly better for noise on a new tire. The tire of the invention is slightly down, as compared to the control, for wet handling and noise after wear.

What is claimed is:

1. A pneumatic tire comprising at least a pair of annular beads, at least one carcass ply wrapped around said beads, tread disposed over said carcass ply in a crown area of said tire, and sidewalls disposed between said tread and said beads, said tread having lugs formed by intersection of lateral grooves and circumferential grooves, the improvement comprising the tread having 80 to 105 pitches and a sipe density in all said lugs of 1.0 to 1.3 sipes per pitch, wherein the tread comprises a center lug portion, intermediate lug portions disposed on either side of the center lug portion, and shoulder lug portions defined by a tread edge and an edge of an intermediate lug portion, the tread having a combined net-to-gross ratio in the center and intermediate lug portions of 0.58 to 0.62, and a net-to-gross ratio in the shoulder portions of 0.75 to 0.8, the tire having a generally rounded footprint shape and a footprint factor of 1.2 to 1.5, and wherein lateral grooves are at substantially full tread depth in the shoulder portion of the tire and are graded to less than full tread depth at the center portion of the tire.

2. The tire of claim 1 which has 4 circumferential grooves.

3. The tire of claim 1 having 98 pitches.

4. The tire of claim 1 having an overall net-to-gross ratio of 0.646.

5. The tire of claim 1 wherein sipes in the shoulder portion of the tire are at substantially 90° with respect to the equatorial plane of the tire.

6. The tire of claim 1 wherein lateral grooves are at substantially full tread depth in the shoulder region of the tire with tie bars ½ tread depth, and are graded to about ⅔ tread depth at the center of the tire.

* * * * *